United States Patent
Helmstetter et al.

(10) Patent No.: US 7,201,393 B2
(45) Date of Patent: Apr. 10, 2007

(54) GAS BAG MODULE

(75) Inventors: Matthias Helmstetter, Aschaffenburg (DE); Udo Bieber, Niedemberg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 311 days.

(21) Appl. No.: 10/761,049

(22) Filed: Jan. 20, 2004

(65) Prior Publication Data

US 2004/0169355 A1 Sep. 2, 2004

(30) Foreign Application Priority Data

Feb. 27, 2003 (DE) ................ 203 03 230

(51) Int. Cl.
*B60R 21/217* (2006.01)
(52) U.S. Cl. .................... 280/728.2; 280/731
(58) Field of Classification Search ............ 280/728.2, 280/728.3, 731
See application file for complete search history.

(56) References Cited

U.S. PATENT DOCUMENTS

| | | | | |
|---|---|---|---|---|
| 5,297,813 A | | 3/1994 | Baba et al. | |
| 5,354,093 A | * | 10/1994 | Schenck et al. | 280/728.3 |
| 5,409,256 A | * | 4/1995 | Gordon et al. | 280/728.2 |
| 5,762,361 A | * | 6/1998 | Herrmann et al. | 280/728.2 |
| 5,992,875 A | * | 11/1999 | Cundill | 280/728.2 |
| 6,086,090 A | * | 7/2000 | Fischer | 280/728.2 |
| 6,296,270 B1 | * | 10/2001 | Amamori | 280/728.2 |
| 6,412,812 B1 | * | 7/2002 | Ford | 280/731 |
| 2002/0149179 A1 | | 10/2002 | Holtz | |

FOREIGN PATENT DOCUMENTS

| | | |
|---|---|---|
| DE | 4332080 | 3/1994 |
| DE | 19837899 | 2/2000 |
| DE | 10100257 | 7/2002 |
| GB | 2270882 | 3/1994 |
| GB | 0832793 | 4/1998 |
| JP | 2001063506 | 3/2001 |

\* cited by examiner

*Primary Examiner*—David R. Dunn
(74) *Attorney, Agent, or Firm*—Tarolli, Sundheim, Covell & Tummino LLP

(57) ABSTRACT

A gas bag module for a vehicle occupant restraint system includes a gas generator carrier (14) with a base (16) and with a peripheral wall (18), and also a covering cap (24) with a side wall (30) extending from a front wall (26) of the covering cap (24). Detent hooks (32) are formed on the edge of the side wall (30) facing away from the front wall (26), which engage into corresponding detent openings (34) in the base (16) of the gas generator carrier (14).

8 Claims, 1 Drawing Sheet

GAS BAG MODULE

TECHNICAL FIELD

The invention relates to a gas bag module for a vehicle occupant restraint system.

BACKGROUND OF THE INVENTION

There are gas bag modules known which have a gas generator carrier with a base and a peripheral wall, and also a covering cap with a side wall extending from a front wall of the covering cap.

A covering cap of a gas bag module is intended to protect the gas bag lying therebeneath from damage before its use. On the one hand, the covering cap is to be easy to install on a vehicle part, for example on the gas generator carrier of the gas bag module; on the other hand, during the unfolding of the gas bag, when the covering cap, depending on the embodiment, either flaps open or tears open, it must be ruled out that the covering cap disengages from the vehicle part. Various possibilities have been suggested for fastening the covering cap to the gas generator carrier. A connecting of the covering cap by means of rivets, a clamping band or a so-called counter-plate requires additional components and manufacturing steps, which makes the installation expensive and costly. In addition, the space requirement for these fastening means restricts the structural space for the gas generator and the gas bag.

From DE-A-198 37 899 there is known a generic gas bag module with a gas generator carrier, which has radially outwardly projecting tongues which in the installed state extend through openings provided in the side wall of the covering cap of the gas bag module and embrace the edge of the side wall which is present above the openings. The arrangement of such tongues on the gas generator carrier is, however, in turn unfavorable from the point of view of optimizing the structural space, because also in this solution, the structural space necessary for the gas bag module is enlarged radially.

EP-A-0 832 793 shows a gas bag module in which a covering cap has a fastening cross-piece with an insert tongue made of a spring steel sheet; the tongue can be deflected, is arrested on the cross-piece and extends into a slit-like opening in the steering wheel hub.

The invention provides a gas bag module with a covering cap, which can be easily and securely arrested on the gas generator carrier, the structural space for the connecting of the covering cap being reduced to a minimum.

BRIEF SUMMARY OF THE INVENTION

According to the invention, a gas bag module for a vehicle occupant restraint system includes a gas generator carrier with a base and with a peripheral wall, and also a covering cap with a side wall extending from a front wall of the covering cap. Detent hooks are formed on the edge of the side wall facing away from the front wall, which engage into corresponding detent openings in the base of the gas generator carrier. This means that the snap connection is not provided in the region of the peripheral wall, but rather in the base of the gas generator carrier. A particular design of the side wall of the covering cap or of the peripheral wall of the gas generator carrier with laterally arranged hooks or the like, which meant a radial restriction to the structural space, can therefore be dispensed with.

A particularly compact structural form of the gas bag module according to the invention is produced in that the external diameter of the side wall corresponds to the internal diameter of the peripheral wall and the detent openings in the base adjoin the peripheral wall. The position of the detent openings makes it possible for the side wall of the covering cap to be able to lie directly against the peripheral wall of the gas generator carrier, so that no unused intermediate space remains.

An optimum support of the covering cap is achieved in that the detent hooks point outwards and engage behind the underside of the peripheral wall facing away from the front wall.

To facilitate installation of the covering cap, it is preferred that the detent hooks can be elastically deformed in radial direction.

A further development of the invention makes provision that to secure the detent connection formed according to the invention, spring elements are formed onto the base, which hold the detent hooks in position when the gas bag module is installed.

Preferably the spring elements can be elastically deformed in the installation direction of the covering cap, in order to make it easier to lead the detent hooks through the detent openings.

A bending back of the detent hooks in radially inward direction is prevented according to a preferred embodiment in that the spring elements provide for a radially outwardly directed prestress of the detent hooks.

DETAILED DESCRIPTION OF THE PREFERRED EMBODIMENTS

Figure 1:
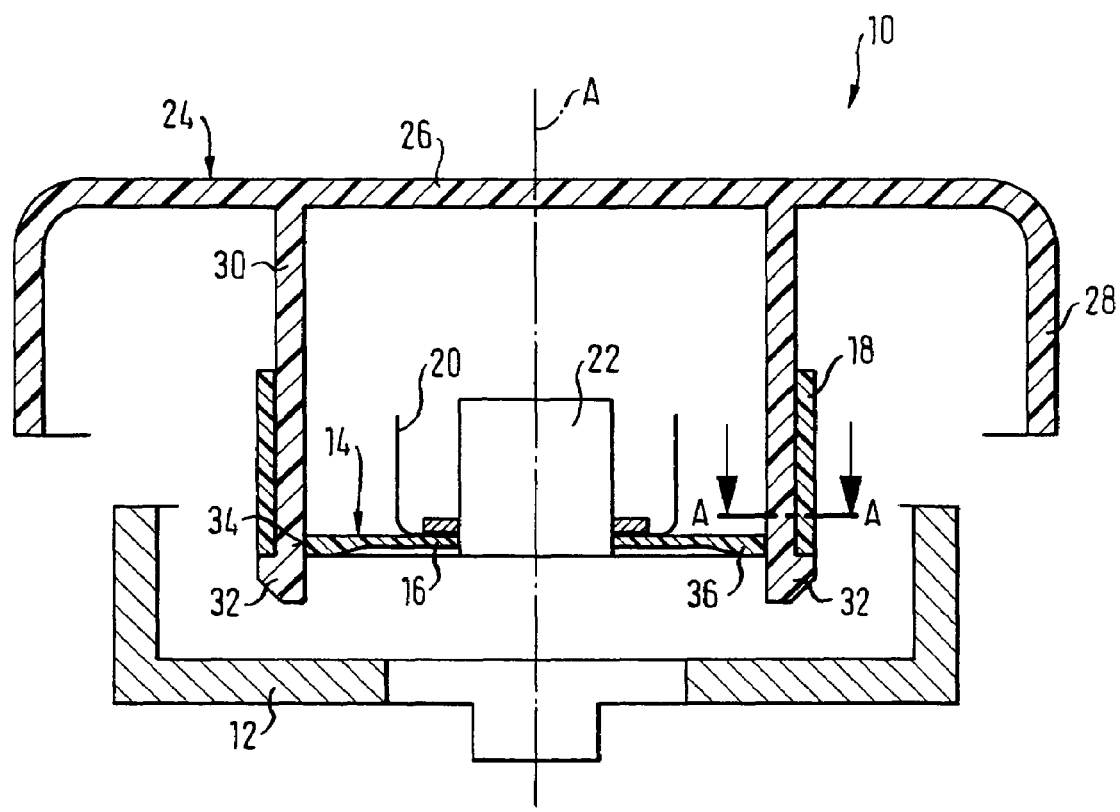
FIG. 1 shows a side view in section of a gas bag module according to the invention and of a steering wheel skeleton.

In FIG. 1 a driver's gas bag module 10 is illustrated, which is fastened to a steering wheel skeleton 12. The gas bag module 10 comprises a gas generator carrier 14 of plastic with a perpendicular base 16, in relation to the central axis A of the gas bag module 10, and with a peripheral wall 18 extending from the outer edge of the base in axial direction. The base 16 and the peripheral wall 18 of the gas generator carrier 14 define an inner space in which a gas bag 20 (only indicated diagrammatically) and a gas generator 22 are arranged, which is fastened to the base 16. The gas bag module 10 is closed by a covering cap 24, which is arrested on the gas generator carrier 14 by means of a detent mechanism which is described more precisely below.

The covering cap 24 has a front wall 26 with an angled edge 28. Extending at right-angles from the front wall 26 is a surrounding side wall 30, the external diameter of which corresponds to the internal diameter of the peripheral wall 18 of the gas generator carrier 14. On the edge of the side wall 30 facing away from the front wall 26, hook-shaped extensions are formed at several sites, pointing radially outwards, which are constructed in one piece with the side wall 30 and are designated hereinbelow as detent hooks 32. The detent hooks 32 can be elastically deformed in radial direction, to facilitate the installation, which is described further below. In the base 16 of the gas generator carrier 14, corresponding detent openings 34 are provided, adjoining the peripheral wall 18, through which the detent hooks 32 are passed. As shown in FIG. 1, in the installed state of the gas bag module 10, the detent hooks 32 engage behind the underside of the peripheral wall 18 facing away from the front wall 26.

Figure 2:
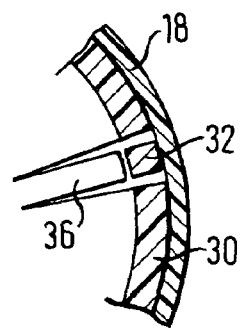
FIG. 2 shows a sectional view along the line A—A in FIG. 1.

The securing of the detent connection takes place, as can be seen in FIG. 2, by means of spring elements 36, which are formed onto the base 16 of the gas generator carrier 14. On placing of the covering cap 24 onto the gas generator carrier 14, the spring elements 36, which are deformable elastically in axial direction, will yield so that the slightly inwardly bent detent hooks 32 can be passed through the openings 34. After the engagement of the detent hooks 32, the spring elements 36 provide for a radially outwardly directed prestress of the detent hooks 32, so that the detent hooks 32 are held in position. (It is only for clarity that in FIG. 2 the spring elements 36 are illustrated spaced apart from the section of the side wall 30 on which the detent hook 32 is formed. In fact, the spring element 36 lies under pressure against this section). An unhooking of the detent hooks 32 from the detent openings 34, caused by vibrations or the like, is in this way prevented.

The invention claimed is:

1. A gas bag module for a vehicle occupant restraint system, said gas baa module (10) including a gas generator carrier (14) and a covering cap (24), said gas generator carrier (14) having a base (16) extending perpendicular to a central axis (A) of said gas bag module and a peripheral wall (18) extending in an axial direction from an outer edge of said base (16), said covering cap (24) having a side wall (30) extending in an axial direction from a front wall (26) of said covering cap (24), detent hooks (32) formed on an edge of said side wall (30) facing away from said front wall (26), said detent hooks engaging into corresponding detent openings (34) in said base (16) of said gas generator carrier (14), thus forming a detent mechanism for connecting the covering cap (24) to the gas generator carrier (14), an external diameter of said side wall (30) corresponds to an internal diameter (18) of said peripheral wall (18) and said detent openings (34) in said base (16) adjoin said peripheral wall (18), wherein said detent hooks (32) point outwards and engage behind an underside of said peripheral wall (18) facing away from said front wall (26).

2. A gas bag module for a vehicle occupant restraint system, said gas bag module (10) including a gas generator carrier (14) and a covering cap (24), said gas generator carrier (14) having a base (16) extending perpendicular to a central axis (A) of said gas bag module and a peripheral wall (18) extending in an axial direction from an outer edge of said base (16), said covering cap (24) having a side wall (30) extending in an axial direction from a front wall (26) of said covering cap (24), detent hooks (32) formed on an edge of said side wall (30) facing away from said front wall (26), said detent hooks engaging into corresponding detent openings (34) in said base (16) of said gas generator carrier (14), thus forming a detent mechanism for connecting the covering cap (24) to the gas generator carrier (14), wherein said detent hooks (32) can be elastically deformed in a radial direction.

3. A gas bag module for a vehicle occupant restraint system, said gas bag module (10) including a gas generator carrier (14) and a covering cap (24), said gas generator carrier (14) having a base (16) extending perpendicular to a central axis (A) of said gas bag module and a peripheral wall (18) extending in an axial direction from an outer edge of said base (16), said covering cap (24) having a side wall (30) extending in an axial direction from a front wall (26) of said covering cap (24), detent hooks (32) formed on an edge of said side wall (30) facing away from said front wall (26), said detent hooks engaging into corresponding detent openings (34) in said base (16) of said gas generator carrier (14), thus forming a detent mechanism for connecting the covering cap (24) to the gas generator carrier (14), wherein spring elements (36) are formed onto said base (16), which hold said detent hooks (32) in position when said gas bag module (10) is installed.

4. The gas bag module according to claim 3, wherein said spring elements (36) can be elastically deformed in an installation direction of said covering cap (24).

5. The gas bag module according to claim 3, wherein said spring elements (36) provide for a radially outwardly directed prestress of said detent hooks (32).

6. The gas bag module according to claim 3, wherein said spring elements (36) yield to allow said detent hooks (32) to pass through said detent openings (34) when said gas bag module (10) is being installed.

7. A gas bag module for a vehicle occupant restraint system. said gas bag module (10) including a gas generator carrier (14) and a covering cap (24), said gas generator carrier (14) having a base (16) extending perpendicular to a central axis (A) of said gas bag module and a peripheral wall (18) extending in an axial direction from an outer edge of said base (16), said covering cap (24) having a side wall (30) extending in an axial direction from a front wall (26) of said covering cap (24), detent hooks (32) formed on an edge of said side wall (30) facing away from said front wall (26), said detent hooks engaging into corresponding detent openings (34) in said base (16) of said gas aenerator carrier (14), thus forming a detent mechanism for connecting the covering cap (24) to the gas generator carrier (14), wherein detent hooks contact said peripheral wall (18).

8. The gas bag module according to claim 7 including a gas bag (20), wherein said gas bag is not positioned between said side wall (30) and said peripheral wall (18).

* * * * *